Sept. 3, 1968   D. J. AGRESTA ETAL   3,399,446
OIL SEAL ASSEMBLING DEVICE
Filed Feb. 17, 1966   2 Sheets-Sheet 1
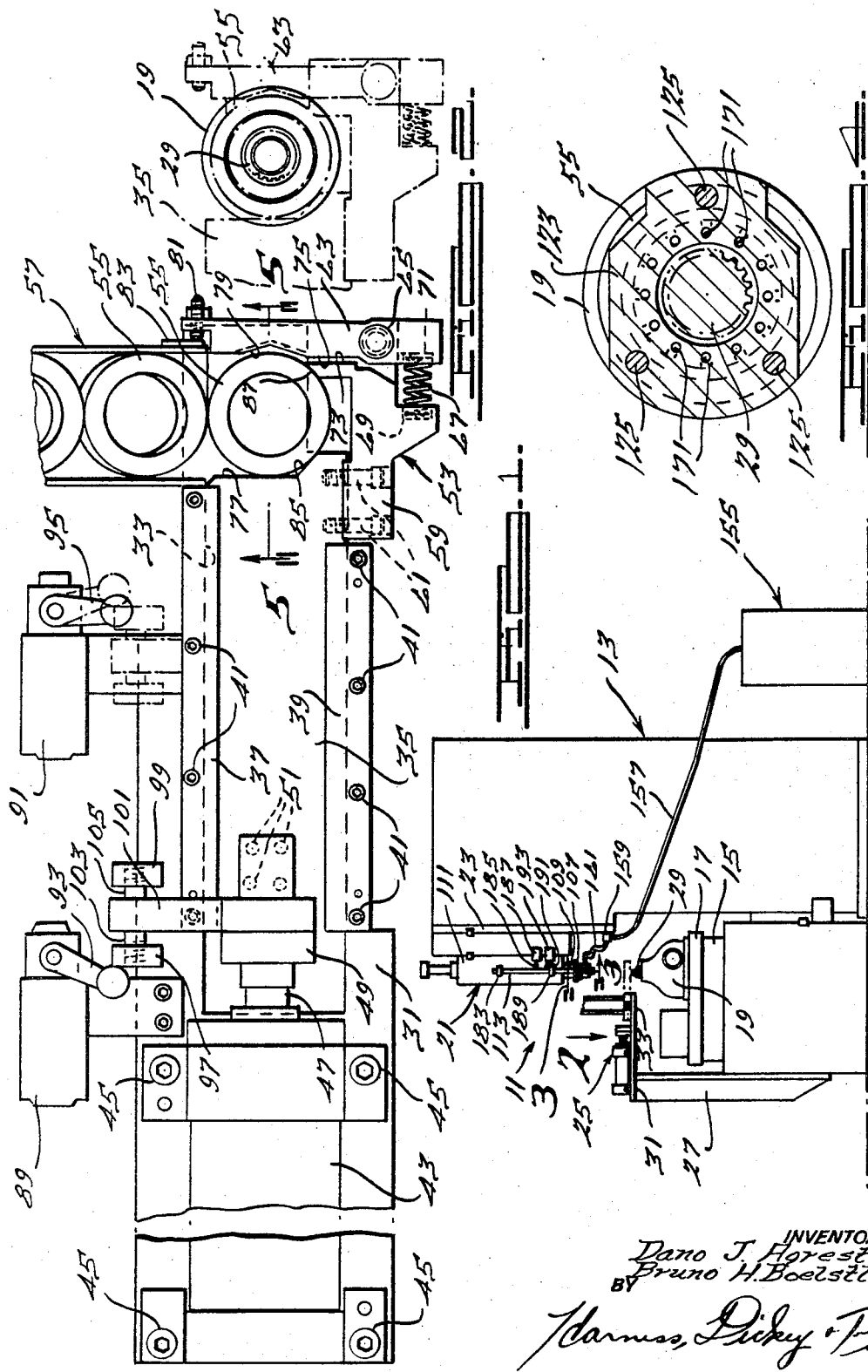
INVENTORS.
Dano J. Agresta,
Bruno H. Boetzler
BY
Harness, Dickey & Pierce
ATTORNEYS.

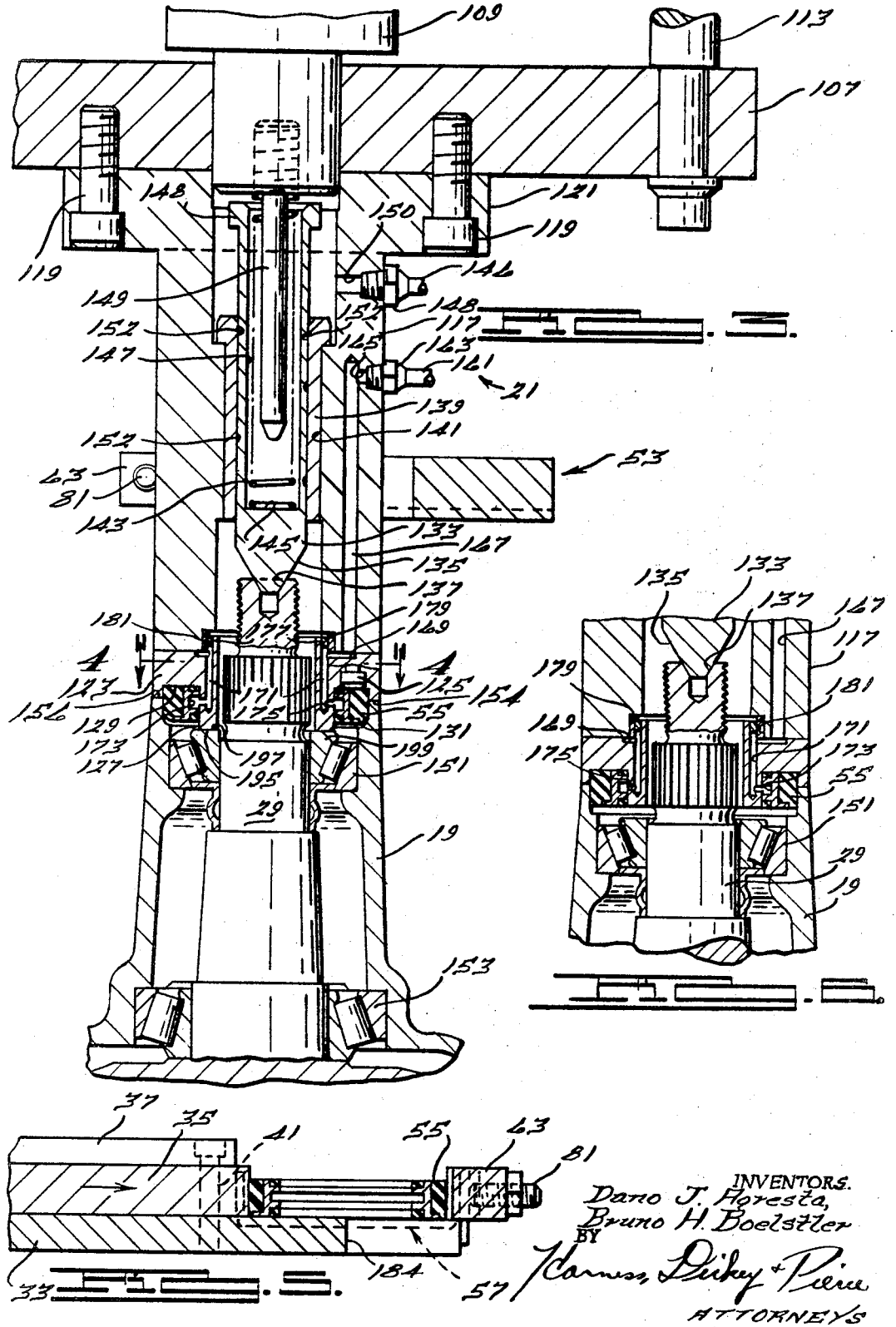

United States Patent Office 3,399,446
Patented Sept. 3, 1968

3,399,446
OIL SEAL ASSEMBLING DEVICE
Dano J. Agresta, Roseville, and Bruno H. Boelstler, Fraser, Mich., assignors to The Cross Company, Fraser, Mich., a corporation of Michigan
Filed Feb. 17, 1966, Ser. No. 528,248
14 Claims. (Cl. 29—200)

ABSTRACT OF THE DISCLOSURE

An apparatus for assembling oil seals comprising means for delivering successive seals to a work station; means for receiving the seals at the work station and for operatively engaging the seals with a workpiece, and means cooperable with for receiving and delivering the seals for supplying lubricant to the seal and workpiece upon assembly thereof.

The purpose of this abstract is to provide a non-legal technical statement of the disclosure of the contents of the instant patent application and thus serve as a searching-scanning tool for scientists, engineers and researchers. Accordingly, this abstract is not intended to be used in understanding or otherwise comprehending the principles of the present invention, herein described in detail, nor is it intended to be used in interpreting or in any way limiting the scope or fair meaning of the claims appended hereto.

---

This invention relates generally to assembling devices, and particularly to one adapted to press an annular seal automatically into a housing opening and to lubricate the inner seal surface.

In installations of the type to which the present invention relates, such as, for example, an automotive differential housing, an oil seal is press-fitted into an opening in the housing and sealingly engages a pinion collar secured to a rotatable spindle which extends into the housing. While the joint between the collar and the seal is adequately lubricated during use by the lubricating oil within the housing, such is not the case in the very initial stages of spindle rotation since the lubricant within the housing requires some time and spindle rotation to lubricate this joint.

To prevent the pinion collar from being scored, and damage to or even complete destruction of the oil seal during initial spindle rotation, it is necessary to lubricate the seal inner surface before the pinion is assembled to the spindle and the pinion collar positioned within the seal. In the past, various approaches to seal lubrication have been employed which include both automatically as well as manually lubricating the seal before it is pressed into the housing. In the automatic devices, the seal is lubricated before it is pressed into the housing and this has presented a problem in that lubricant tends to build up on the seal feeding and handling mechanism which reduces its operating efficiency, making it necessary to shut the mechanism down periodically for cleaning. This problem is made more apparent when considering that the seal pressing device necessarily is piloted on the interior lubricated seal surface. In addition, if the seal is lubricated before it is pressed into the housing, the exposed lubricant can pick up dirt or other abrasive particles which likely will score or otherwise damage the seal or spindle collar. On the other hand, the manual approaches to seal lubrication eliminate the dirt and lubricant build-up problems but are time-consuming and therefore costly and because of human errors do not always result in a uniformly lubricated part. Therefore, a strong need exists for a device capable of both lubricating an oil seal and pressing it into a housing automatically and without the normally attending disadvantages elicited above.

Often, rotating shafts or spindles of the type described require a bearing immediately inboard of the seal to support the spindle for rotation. Accuracy and noise requirements dictate that this bearing be accurately press-fitted on the spindle. In the past, the custom has been to press these bearings on the spindle before the seal is pressed into the housing. Thus, heretofore, lubricating the seal and pressing the bearing and seal on the spindle and in the housing, respectively, required three distinct, expensive and time-consuming operations.

Main objects of the present invention, therefore, are to provide an improved assembling device adapted to press oil seals into a housing and to measurably lubricate the seal automatically.

Further objects include a device of the above character which can be utilized to press a bearing on a spindle within the housing and inboard of the seal.

Additional objects include a device of the above character which is relatively inexpensive to manufacture, rugged in construction and reliable in use.

Other objects and advantages of the present invention will become more apparent from a consideration of the following detailed description taken in conjunction with the drawings in which:

FIGURE 1 is a side elevational view illustrating an assembly device embodying the present invention;

FIG. 2 is an enlarged plan view of a portion of FIG. 1 looking in the direction of the arrow 2;

FIG. 3 is an enlarged sectional view of FIG. 1 taken along the line 3—3 thereof illustrating a preferred form of the present invention;

FIG. 4 is a sectional view of FIG. 3 taken along the line 4—4 thereof;

FIG. 5 is an enlarged sectional view of FIG. 2 taken along the line 5—5 thereof; and FIG. 6 is a view, similar to FIG. 3, illustrating a modified form of the present invention.

Broadly described, the present invention includes reciprocating tool means adapted to press an annular seal into a housing opening, said tool means having port means opening to the seal interior, and means delivering lubricant through said port means when said seal is pressed into said housing. In addition, said tool means may be constructed to engage and press a bearing on a spindle within said housing and inboard of said seal.

Referring now more specifically to the drawings, an assembling device embodying the present invention is illustrated generally at 11 in FIG. 1 and is seen to include a frame 13 having an upwardly facing table 15 along which a plurality of pallets 17 (only one of which is shown) is adapted to slide. The illustrated pallet 17 has a differential housing workpiece 19 supported thereon for movement therewith and is adapted to be controllably moved along the table 15 by means (not shown) to sequentially position each of the housings 19 at one or more work stations. It is to be understood that the illustrated workpiece 19 is exemplary only and that the present invention applies with equal facility to other types of workpiece housings.

As shown in FIG. 1, an oil seal pressing and lubricating apparatus 21 is supported by a face plate 23 fixed to the frame 13 above the table 15 at the work station and is adapted to receive an annular seal from a delivery device 25 carried by a bracket 27 also fixed to the frame 13 and position the seal within an opening in the workpiece housing 19 through which a pinion-carrying spindle 29 projects. According to the present invention, the apparatus 21 both presses the oil seal within the housing 19 and measurably lubricates the seal interior.

Turning now to FIGS. 1, 2 and 5, the seal delivery device 25 is seen to include a base plate 31 fixed at its outer end in cantilever fashion to the bracket 27 and has a channel-shaped inner end 33. A cross slide 35 is slidably supported within the channel end 33 and is held in place by a pair of retainer plates 37, 39 fixed to the channel end 33 of the plate 31 by screws 41. A hydraulic motor 43 is fixed upon the base plate 31 by screws 45 and has a slidably extendable piston rod 47 coupled to a block 49 supported on and fixed to the cross slide 35 by screws 51 so that longitudinal reciprocation of the piston rod 47 causes the cross slide 35 to move from a position illustrated by full lines to the position illustrated by dot-dash lines in FIGS. 1 and 2.

The end of the cross slide 35 spaced from the piston rod 47 is provided with an escapement fixture 53 adapted to singularly receive oil seals 55 from a feeder track 57 fixed to the base plate 31 and positions the seals for pick-up by the pressing and lubricating apparatus 21. As shown in FIG. 2, the escapement fixture 53 includes a base 59 fixed to the cross slide 35 by screws 61. A finger 63 is pivotally secured to the base 59 by a pivot pin 65 and is biased in a counterclockwise direction as seen in the figure by a compression spring 67 having its ends caged in recesses 69, 71 in the base 59 and finger 63, respectively. The base 59 has a forwardly facing flat surface 73 positioned to engage a rearwardly facing flat surface 75 on the finger 63 to limit finger pivotal movement in a counterclockwise direction so that when these surfaces 73, 75 are in engagement, a seal 55 within the fixture 53 is frictionally held between a forwardly facing flat surface 77 on the cross slide 35 and a rearwardly facing, generally V-shaped surface 79 on the finger 63.

With the cross slide 35 in the retracted position shown by full lines in FIG. 2, an adjustable screw 81 on the finger 63 engages an abutment plate 83 fixed to the seal feeder track 57 and pivots the finger 63 slightly in a clockwise direction causing the surfaces 73, 75 on the base 59 and finger 63, respectively, to be spaced as shown. This permits the leading seal 55 in the track 57 to be delivered to the fixture 53 between the surfaces 77, 79 on the cross slide 35 and finger 63, respectively. Feeding of the seals 55 along the feeder track 57 is effected by any suitable means such as by a power operated pusher, by vibrating the feeder track 57 or simply by gravity through inclination of the track 57 from the terminal point at which it joins to the cross slide guiding supporting plate 31. In either case, the seals 55 are delivered in singular fashion to the fixture 53 as shown in FIG. 2.

The cross slide 35 and the fixture base 59 are provided with tapered abutting surfaces 85, 87, respectively, which accurately position the leading seal 55 within the fixture so that when the motor 43 is energized to extend the piston rod 47 and move the cross slide 35 to the position illustrated in dot-dash lines in FIGS. 1 and 2, only the leading seal 55 is carried therewith and the cross slide 35 slides past the seal 55 next in line in the feeder track 57. As soon as the cross slide 35 begins moving in this direction, the screw 81 moves away from the abutment plate 83 and the finger 63 closes on the seal 55 to frictionally hold it until the seal 55 is picked up by the pressing and lubricating apparatus 21 as will be described. When the cross slide 35 returns to the full line position, this seal 55 will have been removed therefrom so that the next oil seal 55 in the feeder track 57 is delivered to the escapement fixture 53 in the same fashion.

Fluid is admitted to the motor 42 by conduit means (not shown) in the usual fashion to reciprocate the cross slide 35 in the manner described. A valve (not shown) controls the directional flow of fluid to the motor 43 and the positioning of this valve may be made to operate in response to actuation of a pair of limit switches 89, 91 fixed to the supporting plate 31. As shown in FIG. 2, the limit switches 89, 91 have pivotally mounted trip arms 93, 95 positioned for engagement with trip blocks 97, 99, respectively. A supporting arm 101 fixed to the block 49 adjustably carries the trip blocks 97, 99 through screw connections 103, 105 so that the trip blocks 97, 99 move together with the closs slide 35.

Initially, the cross slide 35 is positioned as shown by full lines in FIG. 2 with the trip block 97 engaging the trip arm 93. When the device is turned "on," the motor 43 is energized to move the cross slide 35 forwardly or toward the right to the position illustrated by dot-dash lines and positions the seal 55 ready to be picked up by the pressing and lubricating apparatus 21. When the cross slide 35 reaches this position, the trip block 99 engages and pivots the trip arm 95 which opens a bypass valve (not shown) to stop the motor 43 and reverses the valve (not shown) which controls the directional flow of fluid thereto. After the seal pressing and lubricating process is completed, the bypass valve (not shown) is closed so that the motor 43 now moves in a reverse direction, and the cross slide 35 returns to its initial position where the trip block 97 engages and pivots the trip arm 93 to again open the bypass valve and stop the motor 43 and reverse the fluid directional control valve (not shown) to prepare this device for the next cycle. If continuous cycling is desired, a timer may be utilized to close the bypass valve (not shown) after another seal 55 is positioned in the fixture 53, or a part-in-place switch (not shown) may be provided to be engaged by the seal 55 when it is so positioned.

The seal pressing and lubricating apparatus 21 functions to pick up a seal 55 from the fixture 53 when it is in the position shown by dot-dash lines in FIG. 2 during each cycle of the cross slide 35, pressing the seal 55 in the workpiece housing 19 and at the same time measurably lubricating the seal interior. Turning now to FIGS. 1, 3 and 4, the apparatus 21 is seen to include a reciprocating press ram platen 107 connected to the lower end of a vertically reciprocating piston rod 109 by screws (not shown) for movement therewith. The piston rod 109 is controllably reciprocated relative to a hydraulic motor 111 secured to the frame face plate 23 (FIG. 1) by selective delivery of fluid pressure to the motor 111 by means (not shown). A pair of guide rods 113 are fixed at their lower ends to the platen 107 and are slidably disposed in bushings (not shown) fixed to the housing of the motor 111 to assist in vertically guiding the platen 107.

Tool means comprising a tool body 117 depend from the platen 107 and are fixed thereto by screws 119 extending through an integral flange 121 on the tool body and into the platen 107. The tool body 117 has a cross-sectional configuration so as to pass freely through the escapement fixture 53 during movement with the platen 107. The lower end of the tool body 117 has a nosepiece 123 fixed thereto by screws 125, the nosepiece 123 having a cross-sectional configuration as illustrated in FIG. 4, which also represents the cross-sectional configuration of the tool body 117. The nosepiece 123 has a reduced lower end 127 adapted to fit snugly but slidably within the seal 55 and which terminates in a radially outwardly extending seal engaging flat face 129. When the platen 107 moves downwardly as shown in FIG. 3, the nosepiece reduced end 127 moves into the seal 55 held within the escapement fixture 53 until the seal 55 engages the face 129 as shown in FIG. 3. Thereafter, the seal 55 moves downwardly with continued downward movement of the platen until the nosepiece 123 presses the seal 55 into a cylindrical seat 131 in the workpiece housing 19.

To insure accurate alignment between the tool nosepiece 123 and the cylindrical seat 131 in the housing 19, a pin 133 having a conical lower end 135 and guidably carried by the tool body 117 is adapted to be received in a conical seat 137 formed in the outer end of the spindle or shaft 29. The pin 133 is slidably positioned in a cylindrical bushing 139 pressed in an opening 141 in the tool body 117 and is normally biased in a downward direction by a compression spring 143 caged between the lower end of the piston rod 109 and a radial surface 145 which terminates a cylindrical bore 147 formed within the pin 133. Downward movement of the pin 133 is limited by a radial flange 48 thereon adapted to engage the top surface of the bushing 139.

The sliding joint between the pin 133 and the bushing 139 is kept lubricated by oil delivered through a conduit 146 connected by a fitting 148 to an inlet 150 in the tool body 117. The oil is trapped in pockets 152 in the pin 133 and during vertical pin movement insures that the pin and bushing 139 are lubricated. A pin 149, threaded into the lower end of the piston rod 109, is positioned within the spring 143 to maintain its integrity during the upper portion of the stroke of the platen 107.

The spindle 29 is accurately positioned within the housing 19 by one or more bearings 151, 153 so that if some small amount of misalignment exists between the tool body 117 and the oil seal seat 131 in the workpiece housing 19, engagement between the pin conical surface 133 and the conical seat 137 in the spindle 29 cams the spindle and the housing 19 which supports it into accurate alignment with the tool body 117 to receive the seal 55. Preferably, the workpiece housing 19 is not rigidly clamped to the pallet 17 but is supported thereon for limited movement relative thereto. Thus, the seal 55 is thereafter pressed into place in the cylindrical seat 131. A radial shoulder 154 on the nosepiece 123 engages a flat radial surface 156 on the outer end of the housing 19 to limit downward movement of the tool body 117 and insures accurate depth insertion of the seal 55 in the seat 131.

As described above, it is necessary that the seal 55 be lubricated around its interior surface so that the seals and the collar of a pinion (not shown) which later is positioned on the spindle 29 and in engagement with the seal interior are not damaged during the initial stages of spindle rotation. In the past, this lubricating step was carried out either by hand or by automatically greasing the seal 55 before it is positioned in the seal seat 131 which has the disadvantages elicited above. According to the present invention, however, the seal 55 is lubricated after it is pressed into the seat 131 by a measured amount of grease delivered through the nosepiece 123 to the seal interior.

Thus, a grease supply and pump, shown generally at 155 in FIG. 1, delivers grease through a conduit 157 to a metering valve 159 fixed to the face plate 23. A flexible conduit 161 is connected at one end to the metering valve 159 and the other end of the conduit 161 is connected by a fitting 163 to an inlet 165 in the tool body 117 (FIG. 3). An axial passage 167 in the tool body 117 communicates the inlet 165 with an annular recess 169 in the nosepiece 123 which, in turn, communicates with a plurality of angularly spaced axially extending passages 171 in the nosepiece 123. The passages 171 extend from the recess 169 to a position adjacent an annular grease pocket 173 in the inner surface of the seal 55 and are exposed thereto by an annular opening 175 in the nosepiece 123. The upper ends of the passages 171 are closed by plugs 177 and an O-ring 179 is seated in a counterbore 181 in the tool body 117 and engages the top of the nosepiece 123 to prevent pressure loss.

The metering valve 159 is controlled in timed relation to movement of the ram platen 107 and tool body 117 so that when the seal 55 is pressed in the seat 131, a measured amount of grease is delivered to the seal grease pocket 173 through the conduit 161, the passage 167, the recess 169, the passages 171 and the opening 175. When the tool body 117 is thereafter upwardly withdrawn, the lubricant permits the nosepiece 123 to be easily withdrawn from the seal 55 which remains in place in the seat 131, by virtue of its pressed engagement therein. The pinion (not shown) is thereafter mounted on the spindle 29 and the joint between the pinion collar and the seal 55 is fully lubricated.

In use, the device is turned "on" either manually or automatically in response to a workpiece 19 and its supporting pallet 17 being moved into position at the work station. The cross slide 35 is withdrawn at this time and a seal 55 is positioned in the fixture 53 as shown in FIG. 2 and when the device is turned "on," the motor 43 is energized to move the cross slide 35 from the position shown by full lines in FIGS. 1, 2 and 5 to the position shown in FIG. 3 and by dot-dash lines in FIGS. 1 and 2 where the seal 55 is aligned with the nosepiece 123 and a slot 184 in the base plate 131. When the trip block 99 engages the switch arm 95, the cross slide motor 43 stops and the ram motor 111 is energized to move the ram 107 and the tool body 117 downwardly. The nosepiece 123 moves through the fixture 53 picking up the oil seal 55. The conical end 135 of the pin 133 engages the conical seat 137 in the spindle 29 to align the parts and as the tool body 117 continues moving downwardly, the seal 55 is pressed into the seat 131. Downward movement of the ram 107 and tool body 117 stops when a trip block 183 on the guide rod 113 engages an arm 185 of a switch 187 (FIG. 1) which stops the motor 111 and actuates the valve 159 to deliver grease to the seal grease pocket 173. After a time lapse, the ram motor 111 is reversed to withdraw the tool body 117 and nosepiece 123 upwardly away from the workpiece 19 and the fixture 53. Upward ram movement continues until a trip block 189 on the guide rod 113 engages an arm 191 of a switch 193 which shuts off the ram motor 111 and energizes the motor 43 in reverse fashion to withdraw the cross slide 35 to the position shown in full lines in FIG. 2. When the trip block 97 engages the switch arm 93, the motor 43 stops.

If desired, the device may be recycled automatically so that when the trip block 97 engages the switch arm 93, the motor 43 is reversed to begin a new cycle after a seal 55 is positioned in the fixture 53. Alternatively, the motor 43 may remain inactive and be reenergized when the next workpiece 19 and its supporting pallet 17 are positioned at the work station.

Another feature of the present invention is the adaptability of the device to press-fit a spindle bearing, located inboard of the seal 55 and on the spindle 29, in the same sequence as the seal 55 is pressed into the seat 131. Previously, these bearings were press-fitted by a different tool at another station and required more time, operating space and tools and therefore a higher production cost.

According to the present invention, the nosepiece 123 is elongated in an axial direction and is provided with a flat bottom face 195 adapted to engage a top face 197 on the inner race 199 of the conical bearing 151. The nosepiece face 195 is constructed to engage and press the bearing inner race 199 onto the spindle 29 when the ram 107 and the tool body 117 move to their fully down position as illustrated in FIG. 3. Thus, this device both presses the seal 55 into the seat 131 as well as presses the bearing race 199 onto the spindle 29 in the same sequence.

FIG. 6 illustrates a modification of the nosepiece 123 of the present invention where it is desirable not to press the bearing race 199 onto the spindle 29, such as where the bearing is already properly seated, where no bearing is required at this location, or where other parts within the housing 19 would interfere with movement of the elongated nosepiece 123. Thus, here the nosepiece 123 is shortened so as to extend substantially to the bottom of the seal 55 and the device performs only the seal assembling and lubricating steps set out above. In all other respects, the parts are identical and like numerals refer to like parts.

By the foregoing, there has been disclosed an improved and automatic seal pressing the lubricating device calculated to fulfill the inventive object set forth and while preferred embodiments have been illustrated and described in detail above, various additions, substitutions, modifications and omissions may be made thereto without

We claim:
1. In an apparatus for assembling oil seals at a work station,
   means for delivering successive seals to the work station;
   means for receiving each successive seal as it is delivered to the work station and adapted to operatively engage the seal with a workpiece; and
   means cooperable with said means for receiving the seals for supplying a predetermined charge of lubricant to each of the seals upon assembly thereof with the workpieces.

2. An apparatus as set forth in claim 1 which includes tool means adapted to operatively assemble bearing means on a workpiece, said tool means including means engageable with the workpiece for orienting the bearing means with respect to the workpiece upon assembly thereof.

3. An apparatus as set forth in claim 1 which includes tool means having an engagement portion adapted to engage the seals upon assembly thereof with the workpieces, and wherein said means for supplying lubricant is communicable with said engagement portion, whereby lubricant is supplied to a predetermined portion of the seals during assembly thereof.

4. A device as defined in claim 3 wherein said tool means includes a tool body having a nosepiece secured thereto at one end thereof, said nosepiece having a reduced end adapted to fit within said seal.

5. A device as defined in claim 4 wherein said tool means comprises port means including a plurality of axially extending passages in said nosepiece communicating with an annular recess in said reduced end and with a lubricant source.

6. A device as defined in claim 5 wherein said axial passages communicate with said recess through a plurality of radial passages in said nosepiece and passage means in said tool body communicating said axial passages and said lubricant source.

7. A device as defined in claim 1 which includes pilot means carried by said means for engaging said seals with the workpieces, said pilot means adapted to engage said workpieces during each operational cycle to accurately align said workpieces and said seal engaging means.

8. A device as defined in claim 7 which includes tool means and wherein said pilot means includes a pin slidably disposed within said tool means and engageable with a spindle portion located on the workpieces, said pin and spindle portions having complementary engaging surfaces, and resilient means biasing said pin in a direction to engage said spindle portions.

9. A device as defined in claim 1 wherein said seal engaging means includes fixture means adapted to frictionally engage said seals.

10. A device as defined in claim 9 wherein said fixture means is reciprocable from a position withdrawn from said tool means to a position where said tool means engages and removes said seals therefrom.

11. A device as defined in claim 9 wherein said seal engaging means includes a reciprocating cross slide and said fixtures means includes a finger movably secured to and cooperable with said cross slide, and means normally biasing said finger toward said cross slide to frictionally hold a seal positioned therebetween.

12. A device as defined in claim 11 wherein said biasing means comprises spring means interposed between said finger and means fixed to said cross slide.

13. A device as defined in claim 11 wherein said tool means has a cross sectional configuration generally complementary to said fixture and adapted to move freely therethrough, said tool means having a reduced end adapted to fit snugly and slidably within said seals.

14. A device as defined in claim 11 wherein said tool means is adapted to move freely through said fixture.

References Cited
UNITED STATES PATENTS

| | | | |
|---|---|---|---|
| 2,604,692 | 7/1952 | Broden | 29—208 |
| 3,052,955 | 9/1962 | McAndrews et al. | 29—201 X |
| 3,220,104 | 11/1965 | Puidokas et al. | 29—148.4 |
| 3,226,801 | 1/1966 | Abel | 29—149.5 |
| 3,237,279 | 3/1966 | Kohlhagen et al. | 29—149.5 |

THOMAS H. EAGER, *Primary Examiner.*